US008704775B2

(12) United States Patent
Cantrell

(10) Patent No.: US 8,704,775 B2
(45) Date of Patent: Apr. 22, 2014

(54) BIOMETRIC ADJUSTMENTS FOR TOUCHSCREENS

(75) Inventor: Christian T. Cantrell, Sterling, VA (US)

(73) Assignee: Adobe Systems Incorporated, San Jose, CA (US)

( * ) Notice: Subject to any disclaimer, the term of this patent is extended or adjusted under 35 U.S.C. 154(b) by 644 days.

(21) Appl. No.: 12/268,935

(22) Filed: Nov. 11, 2008

(65) Prior Publication Data

US 2013/0120278 A1    May 16, 2013

(51) Int. Cl.
*G06F 3/041* (2006.01)
(52) U.S. Cl.
USPC .......................................................... 345/173
(58) Field of Classification Search
CPC .............................. G06F 3/0418; G06F 3/0426
USPC .................................................. 345/156–179
See application file for complete search history.

(56) References Cited

U.S. PATENT DOCUMENTS

| | | | |
|---|---|---|---|
| 7,103,852 B2 * | 9/2006 | Kairis, Jr. ...................... | 345/173 |
| 7,352,365 B2 | 4/2008 | Trachte | |
| 2002/0008692 A1 * | 1/2002 | Omura et al. .................. | 345/173 |
| 2005/0162402 A1 * | 7/2005 | Watanachote ................ | 345/173 |
| 2005/0253817 A1 * | 11/2005 | Rytivaara et al. ............. | 345/173 |
| 2009/0013282 A1 * | 1/2009 | Mercer ........................ | 715/788 |

FOREIGN PATENT DOCUMENTS

| | | | |
|---|---|---|---|
| EP | 0651544 A2 * | 1/1993 | |
| EP | 651544 | 5/1995 | |
| WO | 2007014064 | 2/2007 | |
| WO | 2007016704 | 2/2007 | |

OTHER PUBLICATIONS

Karlson, et al., "Direct Versus Indirect Input Methods for One-Handed Touchscreen Mobile Computing," ACM, 2007.

* cited by examiner

*Primary Examiner* — Waseem Moorad
(74) *Attorney, Agent, or Firm* — Wolfe-SBMC

(57) ABSTRACT

In some embodiments, a touchscreen may display a graphical user interface with one or more input options and may detect which input options are selected by a user by detecting a user's contact on the touchscreen. The system may determine a new graphical user interface configuration to increase the size and/or spacing of the input options. In some embodiments, one or more of the input options may be removed to increase the space available to increase the size of the other input options. In some embodiments, the system may maintain a history of input option use to determine which input options to remove. In some embodiments, the new graphical user interface configuration may include smaller (and/or additional) input options (e.g., if the contact areas are detected as consistently within the displayed input options).

27 Claims, 16 Drawing Sheets

BIOMETRIC ADJUSTMENTS FOR TOUCHSCREENS

BACKGROUND

1. Field of the Invention

The present invention is directed to input systems; and more particularly, it is directed to touchscreen input systems.

2. Description of the Related Art

Electronic devices such as mobile phones (e.g., the iPhone™, Blackberry™, and Android™ phones), global positioning system (GPS) devices, personal digital assistants (PDAs), and computer systems (including desktop and mobile computers) may use touchscreens for input. Touchscreens allow users to use their finger (or, for example, a stylus) to press a displayed input option (such as an on-screen icon of a virtual keyboard). For example, mobile phones may display a numeric keypad on a touchscreen and a user may enter a phone number by pressing on the touchscreen at positions corresponding to numbers on the displayed numeric keypad. Devices such as PDAs may include a touchscreen with a displayed alpha-numeric keypad to receive text, numbers, etc. for entry of data into electronic appointment calendars, contacts, etc.

While touchscreens provide convenience, they may be challenging to use if the displayed input options are too small for a particular user (this may especially be the case with smaller touchscreens used in portable electronic devices). For example, a user with large fingers or poor hand-eye coordination may have difficulty pressing a specific input option without the user's fingertip overlapping another input option. Because users have different sized fingers and press down with different levels of force (resulting in different contact areas on the touchscreen for different users) it may be difficult to design a touchscreen that is suitable to a variety of users.

SUMMARY

Various embodiments of systems, methods, and computer-readable storage media for touchscreen input systems are disclosed. Touchscreens may be used to receive user input for a variety of electronic devices. The touchscreens may display a graphical user interface with one or more input options (such as icons) and may detect which input options are selected by a user by detecting a user's contact on the touchscreen. The user's contact with the touchscreen may result in a detectable contact area on the touchscreen. The system may detect a position of the contact area and make one or more biometric measurements of the contact area (e.g., measurements of the size/shape of the contact area). The position of the contact area may be correlated with the displayed input options to determine which input option the user selected. If the contact area is too large, it may overlap multiple displayed input options and may therefore be difficult to accurately correlate to the input option the user intended to select. If the contact area is overlapping multiple input options, the system may determine a new graphical user interface configuration to increase the size and/or spacing of the input options. Other reasons for increasing the size and/or spacing of the input options are also contemplated (e.g., if the user input is being received slowly from the user or if the user is making multiple input mistakes). In some embodiments, one or more of the input options may be removed to increase the space available to increase the size of the other input options. In some embodiments, the system may maintain a history of input option use to determine which input options to remove. In some embodiments, the new graphical user interface configuration may include smaller (and/or additional) input options (e.g., if the contact areas are detected as consistently within the displayed input options, if the user's input is faster than a specified threshold, if the user is not making multiple input mistakes, etc).

In various embodiments, determining a new graphical user interface configuration may include the system detecting the position of the contact area corresponding to a user's input and making biometric measurements of the contact area to determine a size/shape of the contact area. In some embodiments, the system may average a history of biometric measurements of at least two past detected contact areas. Determining a second graphical user interface configuration may include determining positions, sizes, and/or spacings of the input options to better accommodate the detected contact areas.

BRIEF DESCRIPTION OF THE DRAWINGS

FIG. 3 illustrates a touchscreen with large contact areas of user input, according to an embodiment.

FIG. 4 illustrates a touchscreen with contact areas from a stylus, according to an embodiment.

Figure 1:
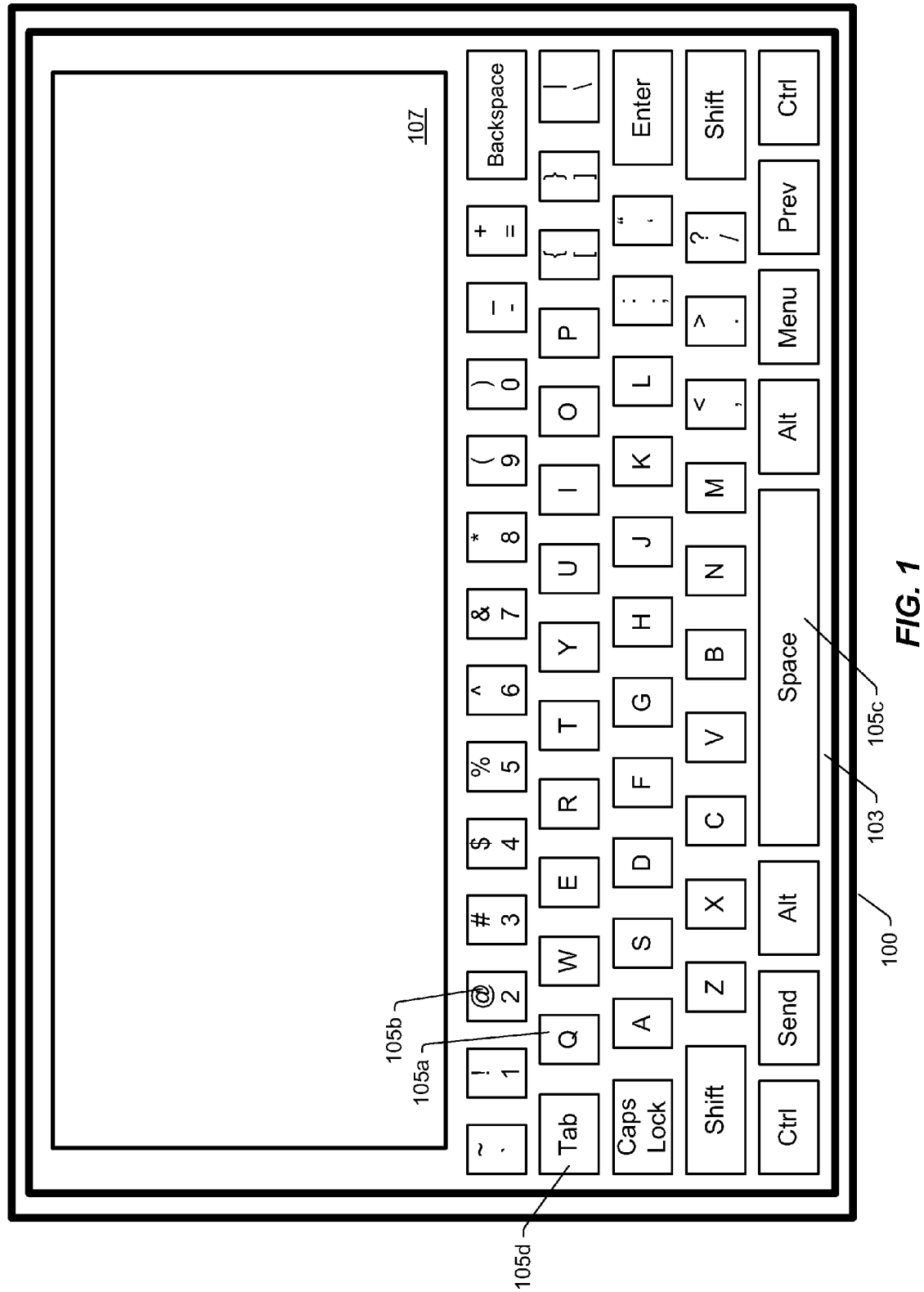
FIG. 1 illustrates a touchscreen interface for a mobile phone, according to an embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 illustrates an embodiment of touchscreen device 100 with graphical user interface 107a. Graphical user interface 107a may include various input options (such as input options 105a-d) displayed on touchscreen 103. Devices 100 with touchscreens 103 may receive input by sensing a position of a user touch on touchscreen 103 in which a graphical user interface 107 is displayed. "Graphical user interface 107" is used herein to generally refer to graphical user interfaces (such as graphical user interfaces 107a, b, c, etc). Graphical user interfaces 107 may include input options 105 such as icons representing keyboard keys (e.g., input options 105a-d), application icons, etc. "Input options 105" is used herein to generally refer to input options (e.g., input options 105a-k). Touchscreen devices 100 may include mobile devices (such as mobile phones, personal digital assistants (PDAs), global positioning system (GPS) devices, etc.) electronic game devices, automatic teller machines (ATMs), computer systems, etc. which use a touchscreen 103 for user input. Touchscreens 103 on touchscreen devices 100 may detect the position of a user touch (e.g., from a user finger or from an object such as a stylus) on touchscreen 103. A processor (e.g., processor 1210 in FIG. 12) coupled to touchscreen 103 may execute program instructions to determine which input option 105 corresponds to the detected position received from touchscreen 103.

In various embodiments, touchscreens 103 may include capacitive touchscreens (including capacitive grid touchscreens), resistive touchscreens, surface acoustic wave touchscreens, and infrared touchscreens. Touchscreens may detect touch by detecting changes in current, sound waves, capacitance, etc. and determining a position corresponding to the change. For example, resistive touchscreens may use multiple conductive layers that form an electronic connection when a user presses on the touchscreen (and correspondingly presses two conductive layers together at a point). Surface acoustic wave touchscreens detect a touch by detecting a resulting change in ultrasonic waves passing over the touchscreen. Capacitive touchscreens may detect changes in the capacitance of a touchscreen resulting from the user's touch. Devices 100 may use the change in current, etc. to detect a position of a user's touch on the touchscreen 103.

Figure 2:
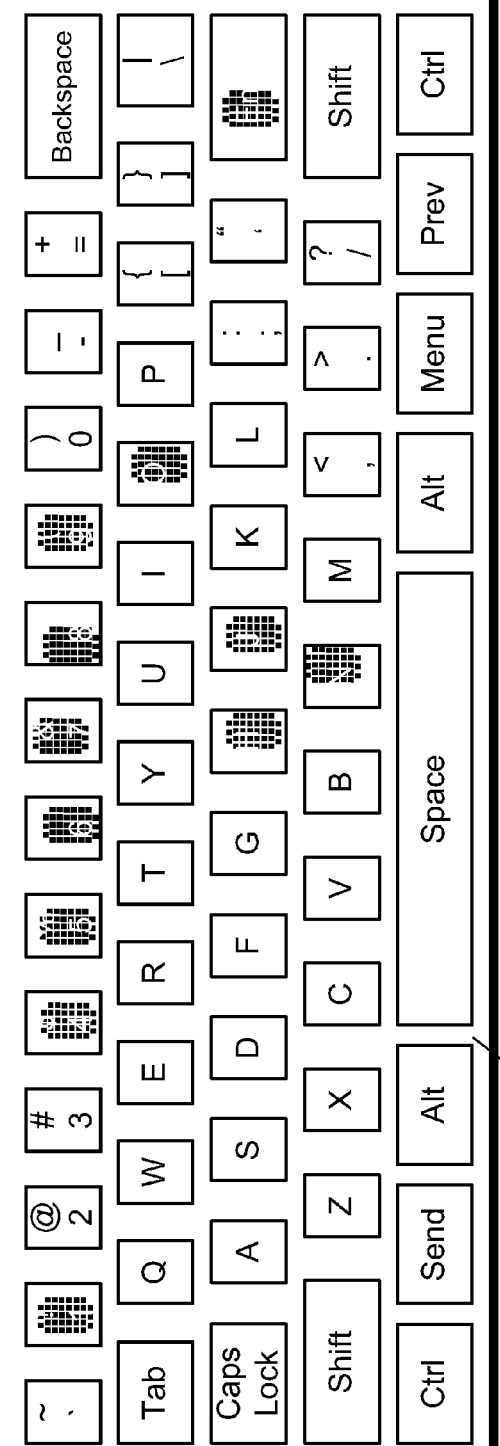
FIG. 2 illustrates a touchscreen and contact areas of user input, according to an embodiment.

FIG. 2 illustrates an embodiment of touchscreen 103 and contact areas (e.g., contact areas 201a-b) corresponding to a user touch on touchscreen 103. "Contact area 201" is used herein to generally refer to contact areas (e.g., contact areas 201a, b, etc.) that represent locations on touchscreen 103 where a user contact (e.g., by finger, stylus, etc.) is detected. FIG. 2 illustrates contact areas 201 that may provide clear indications as to the intended user input. For example, contact areas 201a,b are within the boundary of corresponding displayed input options 105a,b. Therefore, touchscreen device 100 may correctly determine that the user intended to input "2" corresponding to contact area 201a and "o" corresponding to contact area 201b. As illustrated in FIG. 2, user inputs may be used to input information such as contact information. For example, touchscreen device 100 may be a mobile phone, and the user may input new contact information (e.g., for "John") into the mobile phone using touchscreen 103. While contact areas 201 are generally represented as point contacts (e.g., corresponding to a finger press on touchscreen 103), other contact area types are also contemplated. For example, the user may move their finger across touchscreen 103 to produce a line of contact.

Figure 3:
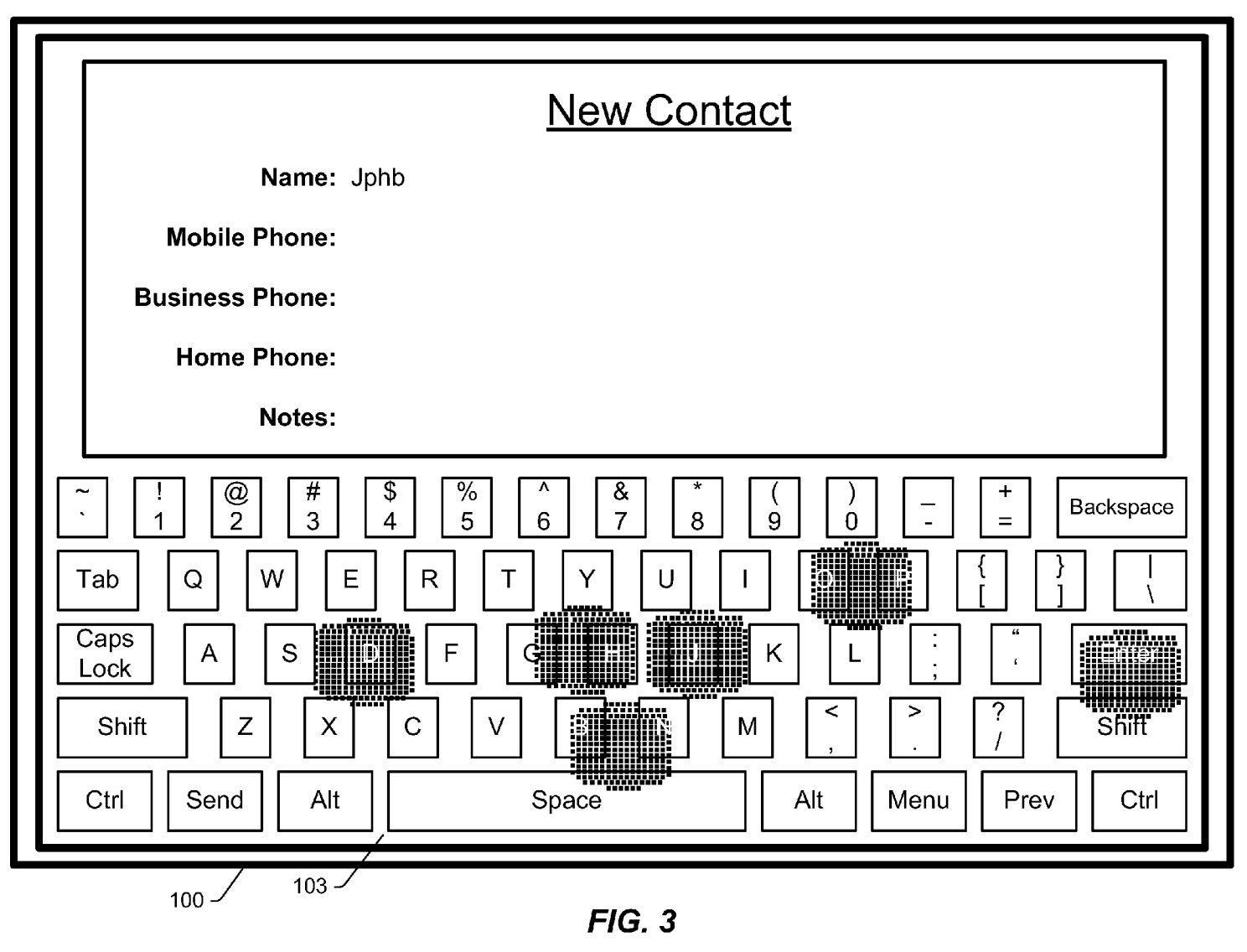

FIG. 3 illustrates an embodiment of touchscreen 103 with contact areas 201 that are larger than contact areas 201 of FIG. 2. As seen in FIG. 3, contact areas 201 resulting from the touch of some users may overlap multiple input options 105 (e.g., contact areas 201c-d). Larger contact areas 201 may result from larger user fingers, a larger application force, etc.

These larger contact areas 201 may make it difficult for device 100 to determine which input option 105 the user intended to enter. In some embodiments, device 100 may be operable to select input option 105 that has the greatest percentage of contact area overlap. For example, device 100 may select "p" as a result of contact area 201c (even though the user may have intended to enter "o"). As another example, device 100 may select "b" as a result of contact area 201d (even though the user may have intended to enter "n"). The misinterpreted inputs may result in device 100 indicating "Jphb" instead of the intended "John" as seen in FIG. 3.

Figure 4:
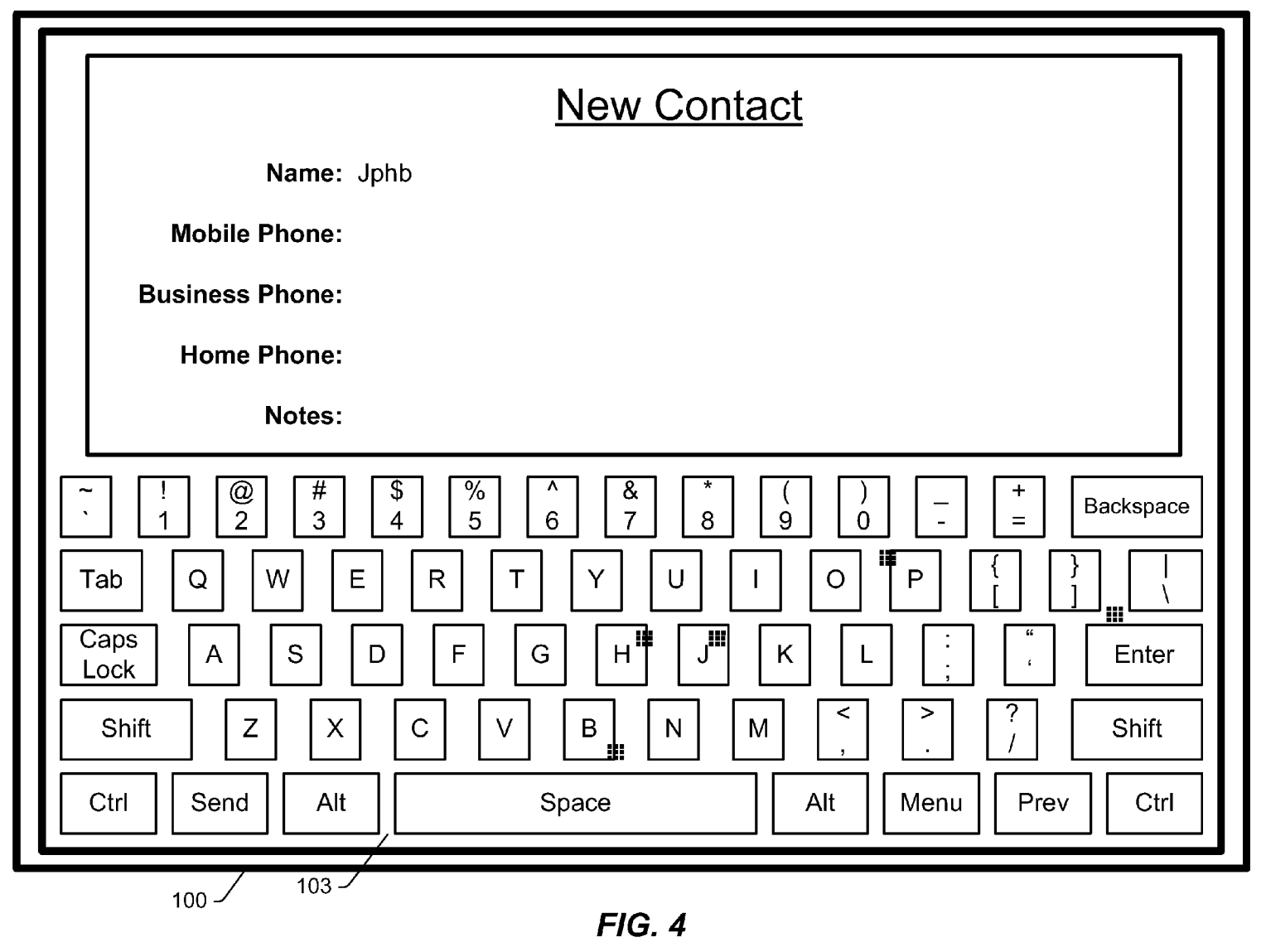

FIG. 4 illustrates touchscreen 103 with contact areas 201 from a stylus, according to an embodiment. In some embodiments, the user may use an object such as a stylus to produce a small point of contact (e.g., see contact area 201e-f). Because a stylus has a smaller contact area footprint than a user's fingerprint, using a stylus may make it easier for a user to select input options 105 from among smaller input options. However, even though the stylus has a smaller contact area footprint, the user may still have a difficult time selecting input options 105. For example, older or physically impaired individuals may have difficulty seeing input options 105 and/or may have difficulty coordinating their hands to select specific input options 105 from smaller input options. Other users who are not necessarily older or physically impaired may also find themselves in situations that make input option selection difficult (e.g., in a moving car, in a low light environment, etc). As an example, the user may press "p" (see contact area 201e) when they intended to press "o" or press "b" (see contact area 201f) when they intended to press "n". These misinterpreted inputs may, for example, result in device 100 indicating "Jphb" instead of the intended "John" as seen in FIG. 4.

In some embodiments, device 100 may be operable to detect when a user makes a mistake (e.g., presses an input option 105 that does not correspond to the input option 105 the user intended to press). Mistakes may be detected through actions taken by the user to correct the mistake (e.g., backspace key, accepting a device-provided correction option such as a correct spelling for a misspelled word, etc). Other mistake determinations may also be used (e.g., device 100 may predict which inputs are mistakes based on predetermined/predicted patterns of input). In the example shown in FIG. 2, the device may determine that the user correctly pressed the intended input options 105 to provide input for the mobile phone number for a new contact. For example, the determination may have been based on the user not having to make corrections to the entered contact information. Conversely, in FIG. 3 and FIG. 4, the user may have needed to backspace to correct the spelling of "John". The backspace may have indicated the presence of one or more errors (e.g., by comparing the corrected "John" to the originally entered "Jphb", the device may be able to determine that the user's contact areas for "o" and "n" were incorrectly entered by the user as "p" and "b", respectively. In some embodiments, device 100 may be able to detect the number of corrections and/or where the corrections were applied and may use this information in determining the graphical user interface configuration (e.g., by determining which input options 105 need to be resized).

Figure 5:
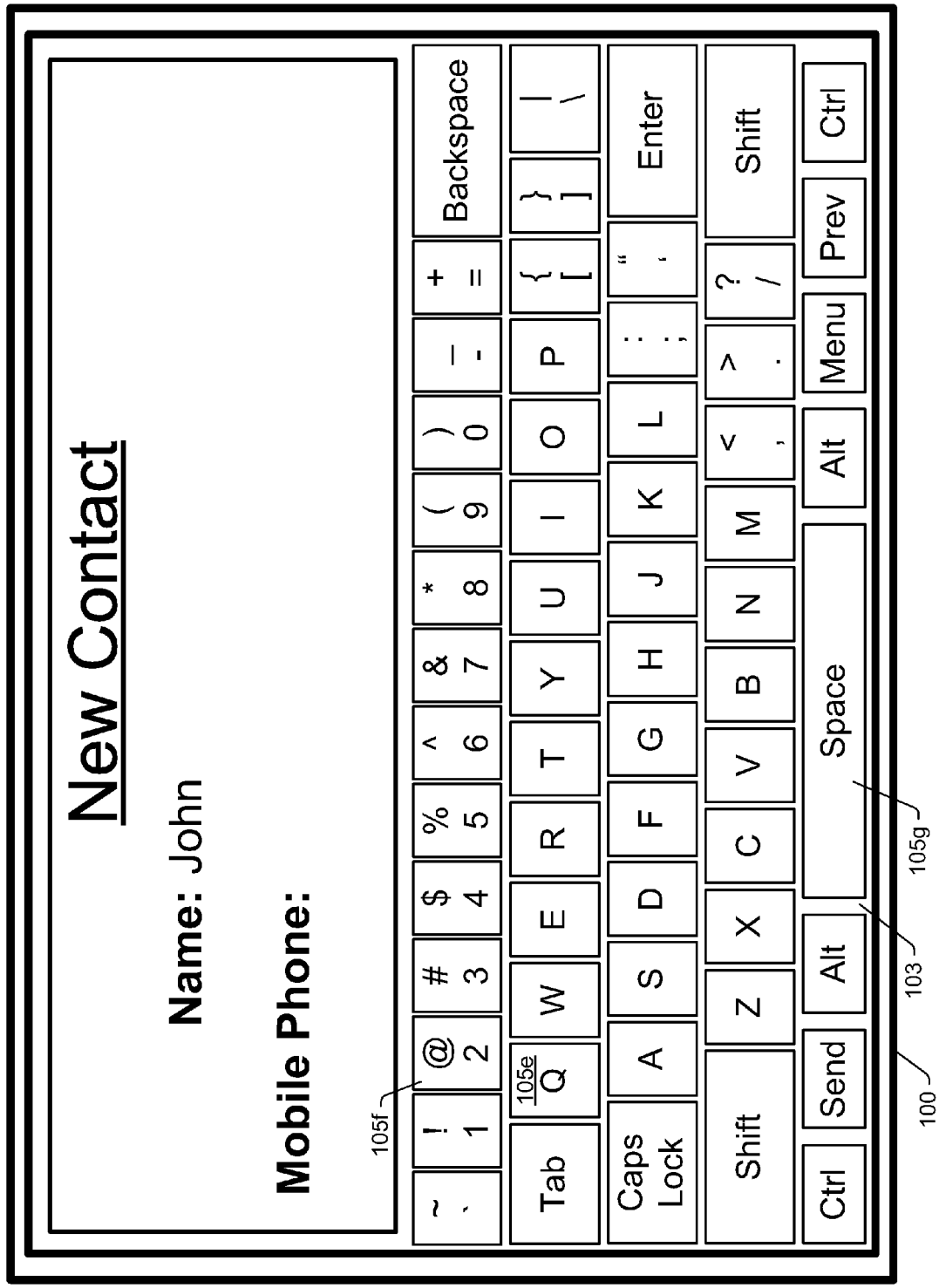
FIG. 5 illustrates a touchscreen with a graphical user interface using larger input options, according to an embodiment.

FIG. 5 illustrates touchscreen 103 with graphical user interface 107b using larger input options 105 than graphical user interface 107a, according to an embodiment. For example, input options 105e and 105f may be larger than corresponding input options 105a and 105b in FIG. 1. Larger input options 105 may make it easier for a user with large fingers or who is pressing down hard on touchscreen 103

(resulting in a larger contact area) to select a specific input option 105 on graphical user interface 107. Larger input options 105 may also make it easier for a visually impaired individual to see input options 105 for better selection. Other reasons for increasing the size and/or spacing of input options 105 are also contemplated (e.g., if the user input is being received slowly from the user indicating the user is having trouble locating specific input options). Larger input options 105 may also be easier to select by someone with limited hand-eye coordination or who is in a low-light environment, etc. In some embodiments, a subset of input options 105 may be made larger (e.g., input option 105g may be the same size as original input option 105c). For example, the more commonly used input options 105 may be made larger and the less used input options 105 may be kept the same size (or made smaller).

In some embodiments, contact area 201 corresponding to the user touch and biometric measurements of contact area 201 (e.g., size/shape of contact area 201) may be detected and used by device 100 to determine a configuration for graphical user interface 107. The biometric measurements of contact area 201 may correspond to the biometric measurements of the user's fingerprint. In some embodiments, the configuration for graphical user interface 107 may include which input options 105 are to be displayed, the size of input options 105, the arrangement of input options 105, etc. In some embodiments, if device 100 determines the user's contact area 201 is too large for the current graphical user interface configuration, device 100 may provide a new graphical user interface configuration. For example, as displayed in FIG. 5, device 100 may increase the size of input options 105 (e.g., see graphical user interface 107b). In some embodiments, the biometric measurements may also indicate to device 100 which fingers the user is using for input. For example, device 100 may store characteristic shapes/positions for thumb inputs, forefinger inputs, etc., and may compare these characteristic shapes/positions to the shapes of contact areas 201 detected. If device 100 detects the user is using their thumbs for input, device 100 may propose/implement a graphical user interface configuration that is easier for thumb inputs (e.g., with larger input options 105, more space between input options 105, and/or with more input options 105 toward an edge of touchscreen 103 and fewer toward the center).

In some embodiments, device 100 may also adjust other aspects of the display to accommodate the new graphical user interface configuration. For example, device 100 may reduce the size of output display area 107. Other accommodations may also be made (e.g., less information may be displayed on output display 107, output display 107 may be made brighter, may use a larger font, etc). In some embodiments, output display area 107 may be on a separate screen or may be displayed on the same screen as graphical user interface 107. In some embodiments, device 100 may automatically adjust graphical user interface 107 and other display characteristics. In some embodiments, device 100 may suggest a different graphical user interface 107 and/or display characteristics to a user who may then accept or reject the suggestions. For example, device 100 may display a new graphical user interface 107 along with a message such as "Keep new input interface (Y/N)?" and wait for a user input. In some embodiments, device 100 may provide a reason for why a new graphical user interface 107 is being suggested.

Figure 6:
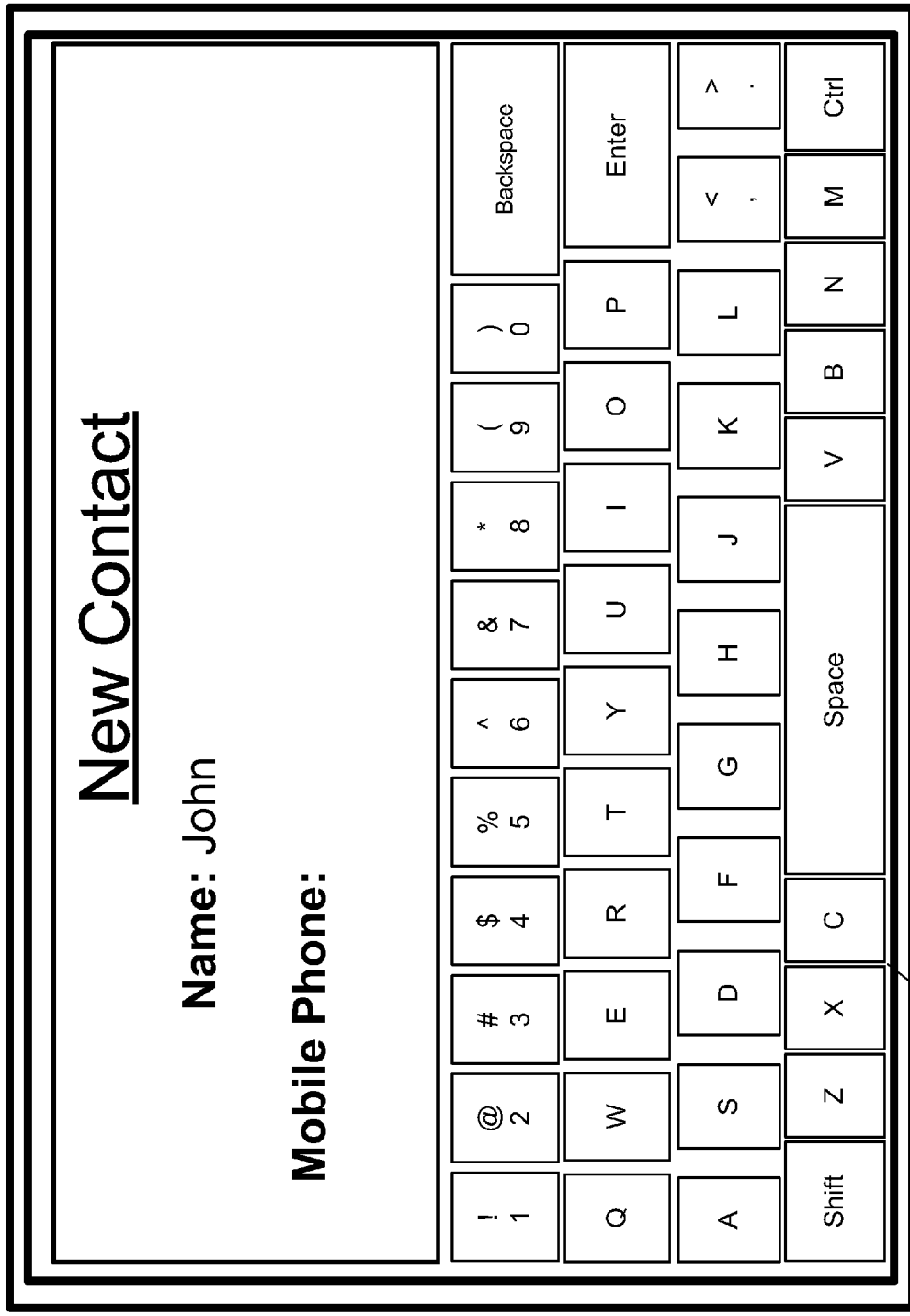
FIG. 6 illustrates a touchscreen with a graphical user interface using larger input options and a smaller subset of input options, according to an embodiment.

FIG. 6 illustrates an embodiment of touchscreen 103 with graphical user interface 107c using larger input options 105 and a smaller subset of input options 105 on graphical user interface 107c. In some embodiments, device 100 may remove some of input options 105 in graphical user interface 107 to make additional room to enlarge the remaining input options 105 (or a subset of the remaining input options 105). Device 100 may determine which input options 105 are used less frequently than the other input options 105 and may remove the less frequently used input options 105. Conversely, device 100 may determine which input options 105 are used more frequently and remove the least used input options 105. In some embodiments, device 100 may store a history of input options 105 used and analyze the history to determine which input options 105 are used more frequently (or less frequently). The frequently used input options 105 (or a subset of the frequently used input options 105) may be made larger. In some embodiments, a default subset of input options 105 may be removed (e.g., without analyzing a history of past usage). Less commonly used input options 105 such as the tilda key, backslash key, etc. may be preset to be removed when a larger input option graphical user interface configuration is used. As shown in FIG. 6, input options 105v and 105w may be even larger than corresponding input options 105e and 105f (shown in FIG. 5) which may be larger than original corresponding input options 105a and 105b (shown in FIG. 1). Input option 105x may be larger than input option 105g (which may be the same size as input option 105c). In some embodiments, input options 105 may remain the same size, but additional space may be provided between input options 105. For example, by displaying fewer input options 105 at a time, there may be additional space to distribute between the displayed input options 105. The additional space may reduce the overlap of contact area 201 on input options 105 the user did not intend to select which may result in an easier determination of input option 105 the user intended to select. In some embodiments, device 100 may also change an error threshold for graphical user interface 107. For example, if contact areas 201 are detected to be large, the error threshold for determining which input option 105 was selected might be increased. The increased error threshold may, for example, assign more surrounding area to each input option 105 for device 100 to analyze when determining which input option 105 corresponds to contact area 201.

Figure 7A:
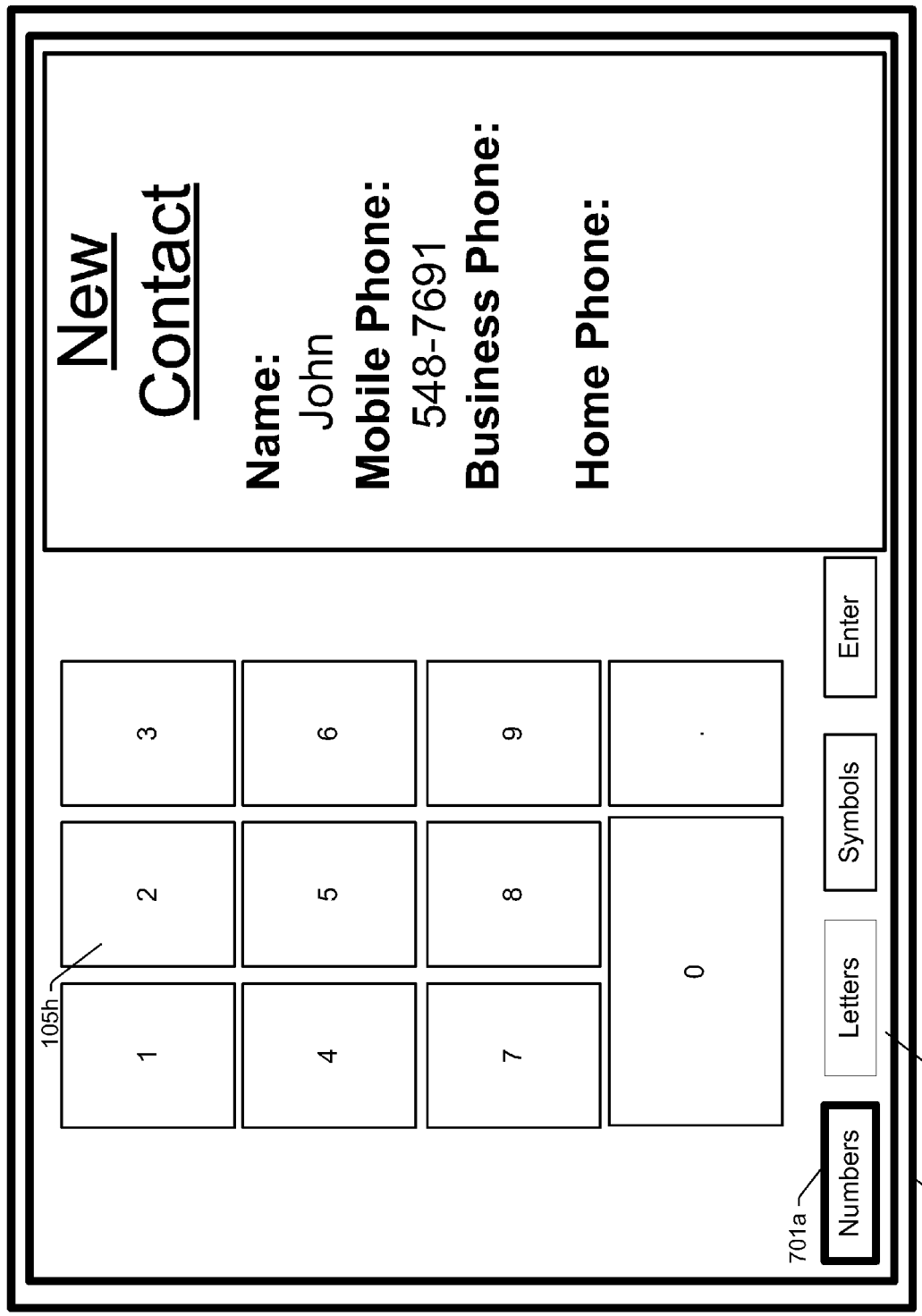
FIGS. 7a-b illustrate a graphical user interface accessible in multiple menus, according to an embodiment.
Figure 7B:
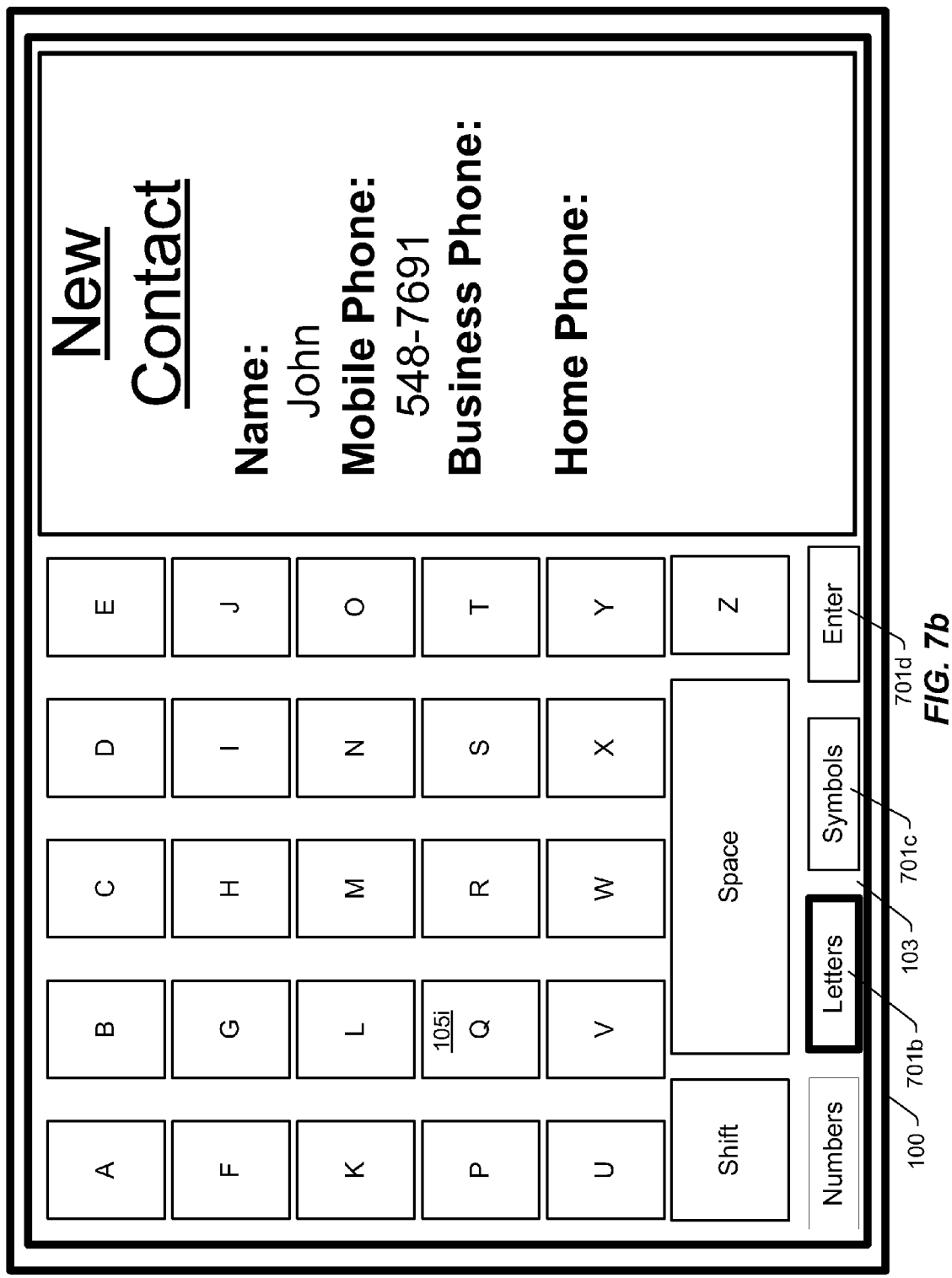

FIGS. 7a-b illustrate graphical user interfaces 107d-e accessible in multiple menus, according to an embodiment. To make input options 105 larger, device 100 may split input options 105 of one graphical user interface 107 across multiple graphical user interfaces 107 accessible through different menus. For example, input options 105 from graphical user interface 107a may be made available in graphical user interface 107d (e.g., with numerical user options 105 such as input options 105h) and graphical user interface 107e (shown in FIG. 7b) (e.g., with letter user options 105 such as 105i). Menus may be accessed, for example, by pressing a menu selection input option 105 such as "Numbers" 701a in FIG. 7a to access graphical user interface 107d with numbers or "Letters" 701b in FIG. 7b to access graphical user interface 107e. In some embodiments, graphical user interface 107 may be made large enough to occupy two or more screens and input options 105 may be accessed through scrolling (e.g., using a side scroll bar or a dial wheel on a mouse). Other access methods for larger graphical user interfaces 107 are also contemplated.

Figure 8:
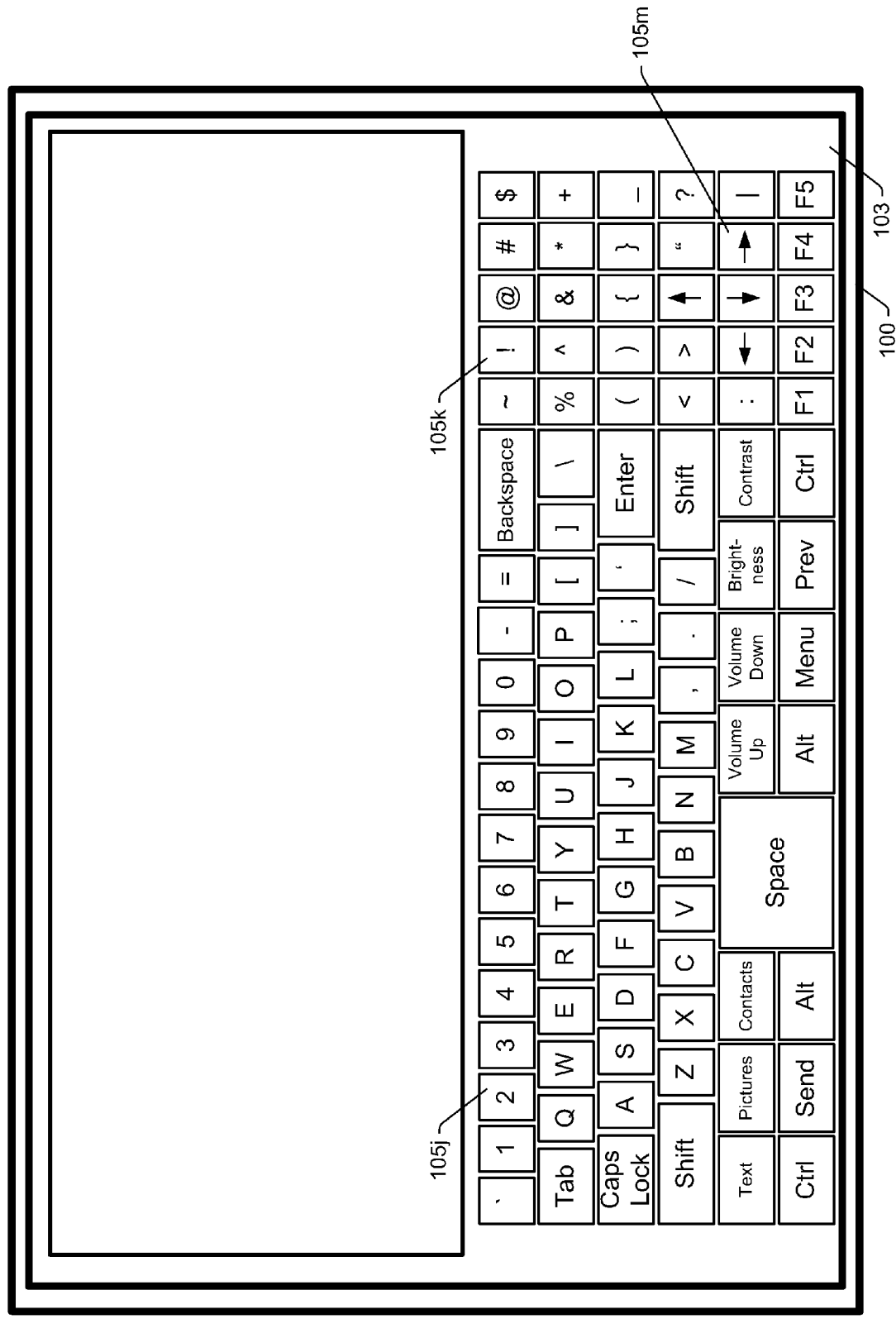
FIG. 8 illustrates a graphical user interface with smaller input options and additional input options, according to an embodiment.

FIG. 8 illustrates graphical user interface 107f with smaller input options 105 and with additional input options 105, according to an embodiment. In some embodiments, device 100 may make input options 105 smaller and/or increase the number of displayed input options 105. For example, if device 100 detects that the user produces a small contact area (e.g., has smaller fingers, is using a light contact force, and/or is using a stylus), device 100 may provide a graphical user input configuration with smaller and/or additional input options 105. In some embodiments, the additional input options 105 may include input options 105 that are not commonly used, but provide increased convenience for a user to have readily available such that the user does not need to search through menus, etc. to find a specific input option 105 when needed. For example, a user may not frequently access the volume up/volume down input options, but providing these input options 105 on graphical user interface 107f may make it easier for the user to access these input options 105 when needed. In some embodiments, device 100 may adjust the size of input options 105 proportionately to the size of the detected contact area 201. For example, device 100 may make the width and/or height of input options 105 large enough to accommodate contact area 201. In some embodiments, the width/height criteria may allow device 100 to shrink input options 105 which may allow device 100 to fit more input options 105 into graphical user interface 107. In some embodiments, the width/height criteria may result in larger input options 105 and/or fewer displayed input options 105 (which may be larger and/or have additional space between input options 105).

Figure 9A:
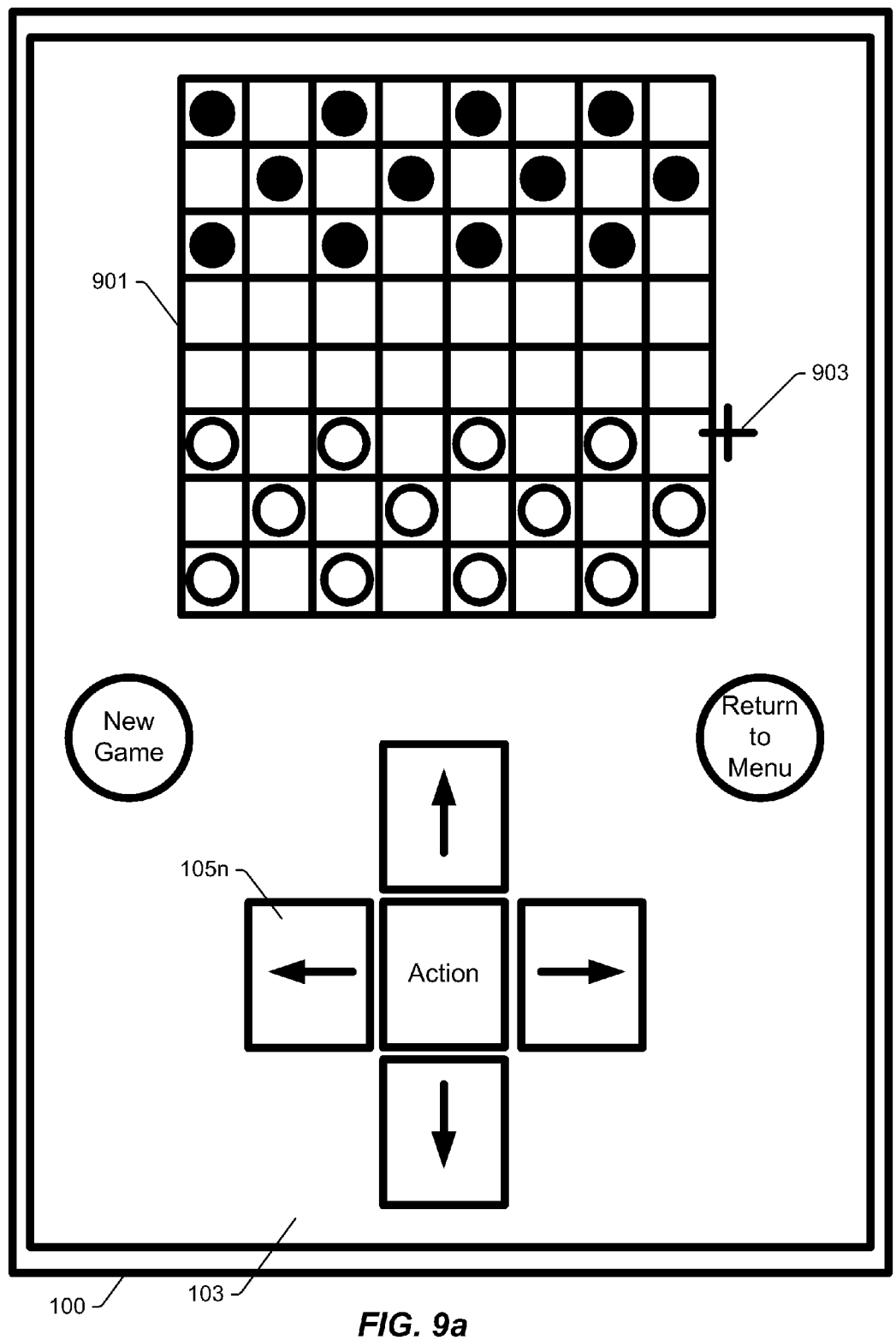
FIG. 9a illustrates a graphical user interface for an electronic game, according to an embodiment.
Figure 9B:
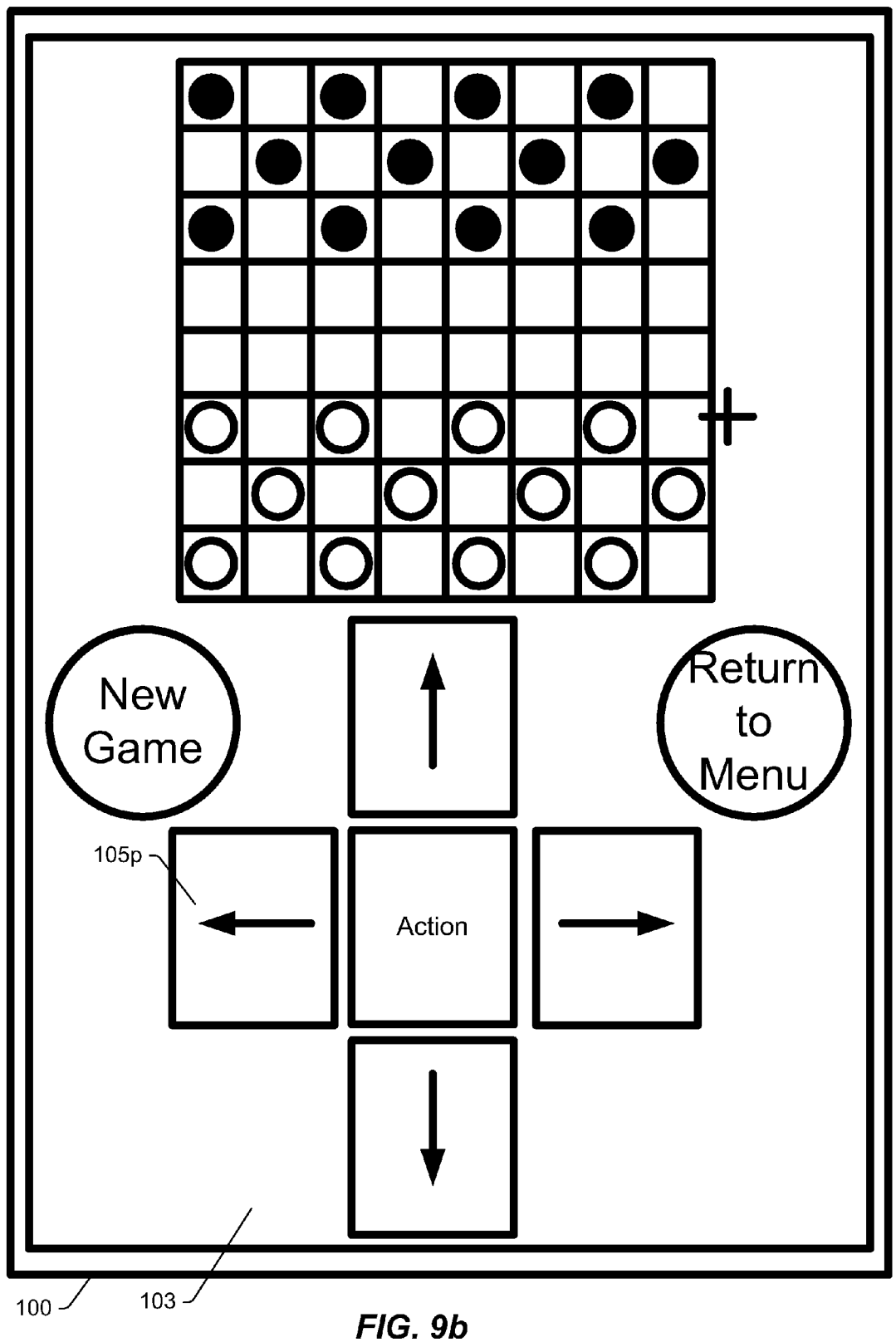
FIG. 9b illustrates a graphical user interface for the electronic game using larger input options, according to an embodiment.

FIG. 9a illustrates graphical user interface 107g for an electronic game, according to an embodiment. Touchscreen device 100 may be used to display games for user entertainment. Graphical user interface 107g may be used by the user to provide inputs for playing the game. For example, arrow user options 105, "new game", "return to menu", etc. may be used to provide user input. In some embodiments, input options 105 may be increased in size to accommodate larger contact areas. In addition, input options 105 may be moved or spaced out to accommodate user patterns. For example, if the user is missing an arrow key and pressing the empty space near the arrow key (e.g., to the right of the right arrow key or to the left of the left arrow key), the corresponding input option 105 may be increased in size and/or moved. Graphical user interface 107 may be adjusted mid-game as the intensity of the game changes. For example, as the user gets more excited, he may be more prone to mistakes, while, during slower parts of a game, the user may be more accurate in input option selection. Graphical user interface configurations may also be adjusted for different games. For example, the sizes of input options 105 for an action game may be larger than input actions for a slower-paced chess or maze application. FIG. 9b illustrates graphical user interface 107h for the electronic game using larger input options, according to an embodiment. For example, input option 105p of graphical user interface 107h (see FIG. 9a) is larger than corresponding user option 105n in graphical user interface 107g (see FIG. 9b).

Figure 10A:
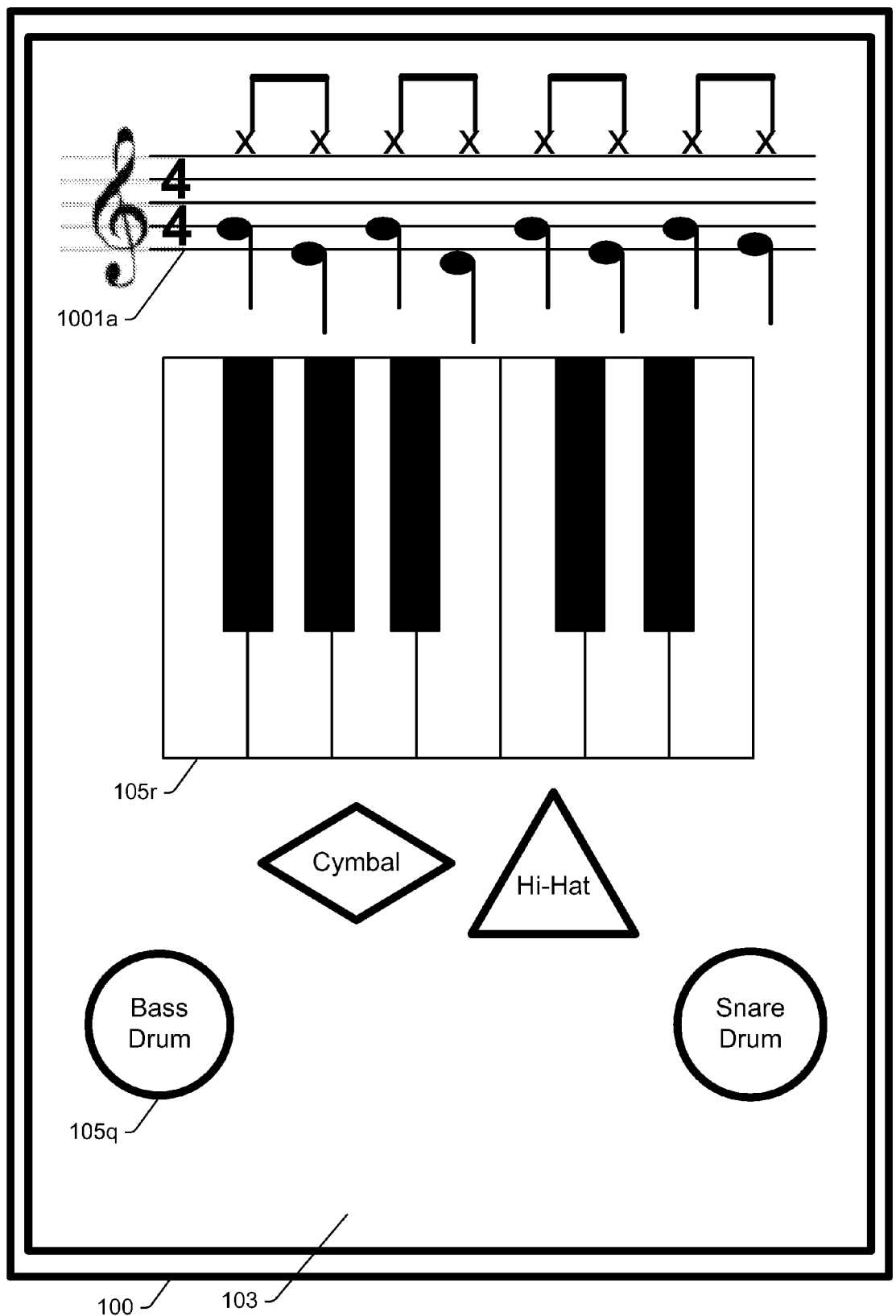
FIG. 10a illustrates a graphical user interface for a musical electronic device, according to an embodiment.
Figure 10B:
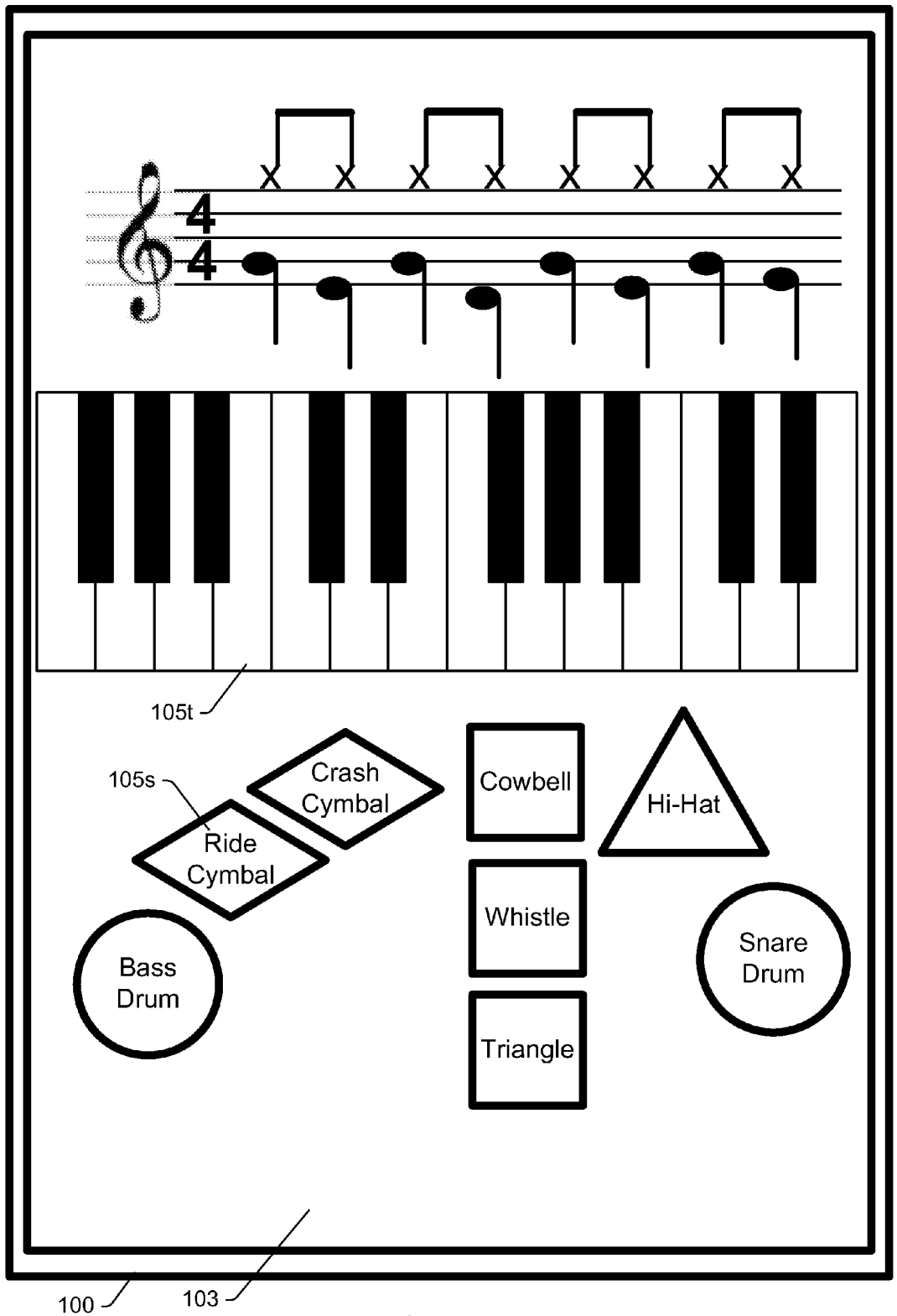
FIG. 10b illustrates a graphical user interface with smaller input options and additional input options, according to an embodiment.
Figure 10C:
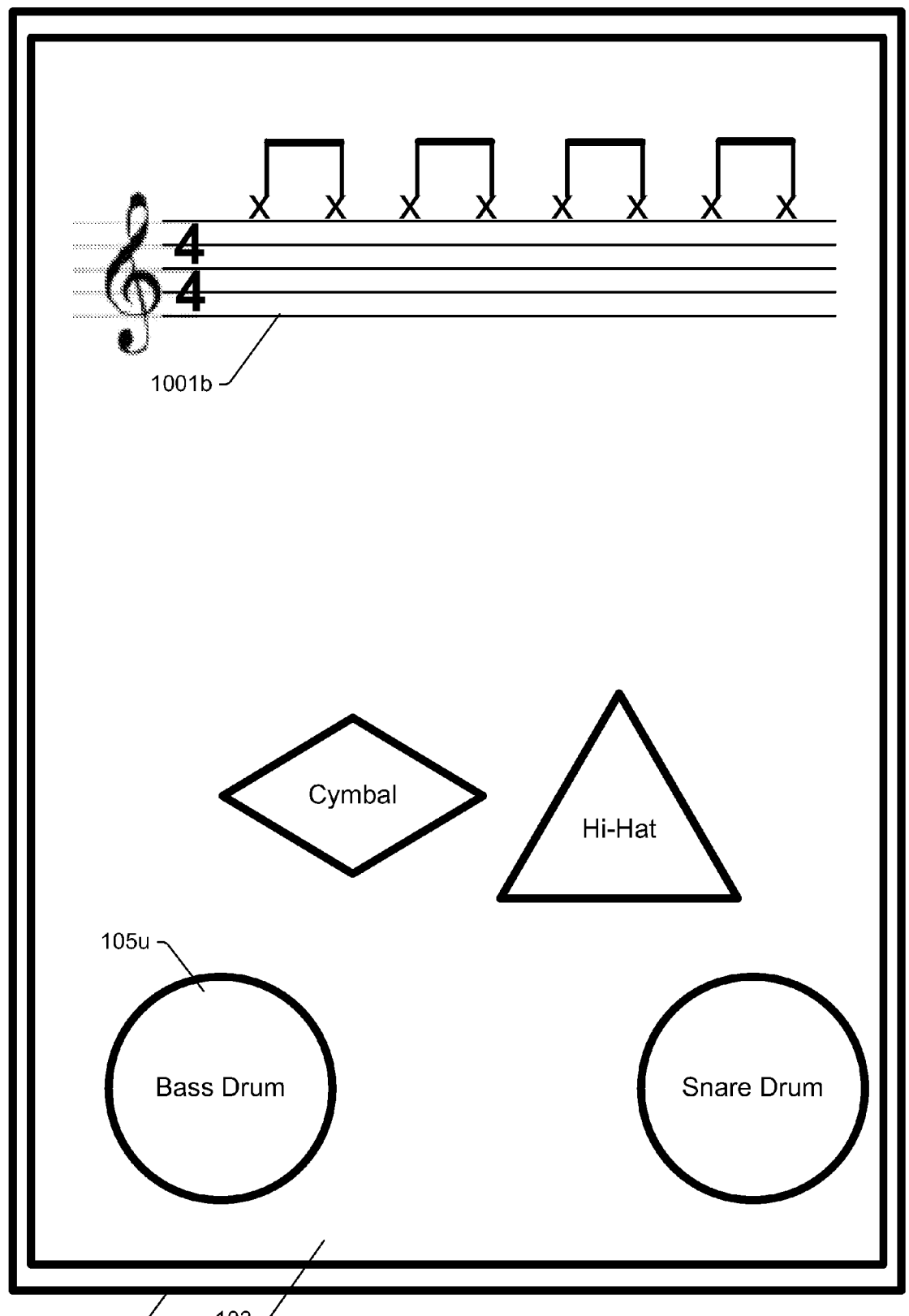
FIG. 10c illustrates a graphical user interface with larger and fewer input options, according to an embodiment.

FIG. 10a illustrates graphical user interface 107j for a musical electronic device 100, according to an embodiment. In some embodiments, graphical user interface 107j may be used to provide input into a music application. For example, the user may press input options 105r and 105q of graphical user interface 107j to play music (which may be diagrammatically reproduced at 1001a on the display). If device 100 detects contact areas 201 of the user (e.g., contact areas 201g, h) are within the input option boundaries and/or the user is not indicating mistakes were made, device 100 may determine a new graphical user interface configuration to include additional input options 105 (and/or smaller input options 105 as in graphical user interface 107k displayed in FIG. 10b). For example, input options 105t and 105s represent additional input options 105 provided on graphical user interface 107k by using the space made available by making input options 105 smaller. If contact areas 201 (e.g., contact area 201j) overlap with multiple input options 105, device 100 may determine a new graphical user interface configuration 107m with larger input options 105 (and/or fewer input options 105 as displayed in FIG. 10c). For example, the piano key input options 105 may have been removed to enlarge and space out the remaining percussion input options 105 in graphical user interface 107m.

Figure 11:
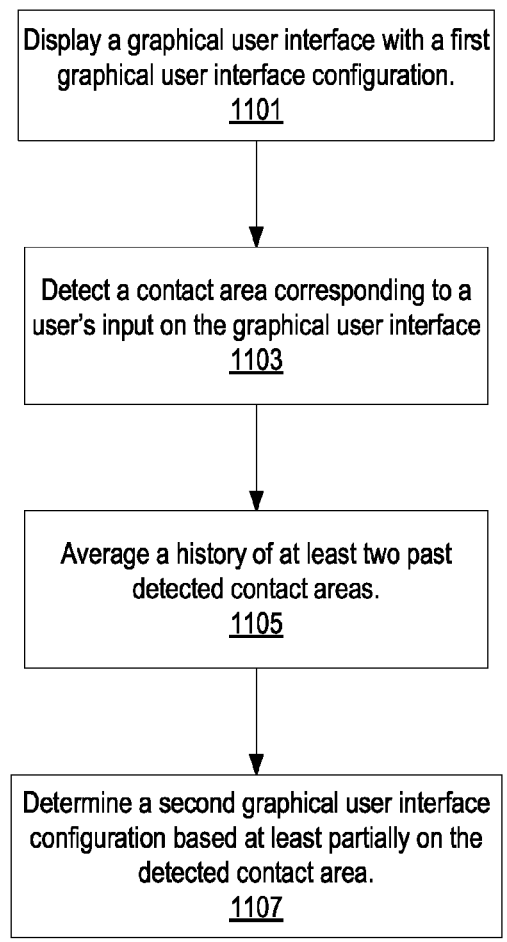
FIG. 11 illustrates a flowchart for determining a second graphical user interface configuration, according to an embodiment.

FIG. 11 illustrates a flowchart for determining a second graphical user interface configuration, according to an embodiment. In various embodiments, the operations described below may be performed in a different order than the illustrated order. The operations described below may be performed programmatically (i.e., by a computer according to a computer program). Further, the operations described below may be performed automatically (i.e., without user intervention). In some embodiments, the operations may be performed by the operating system and/or at the application level of device 100 (such as a phone and/or computer system).

At 1101, device 100 may display graphical user interface 107 with a first graphical user interface configuration. For example, a default configuration (such as seen in FIG. 1, FIG. 9a, and FIG. 10a) may be displayed. In some embodiments, the user may select which input options 105 should be displayed in the initial graphical user interface 107.

At 1103, device 100 may detect contact area 201 corresponding to a user's input on graphical user interface 107 (e.g., see contact area 201a on input option 105b). Information about contact area 201 may be received by software interacting (or at least listening) to signals from touchscreen 103. For example, the software may be part of an application programming interface (API) that acts as an interface between the detected signals (from touchscreen 103) indicative of contact area 201 and the operating system. In some embodiments, software objects may be attached to input options 105 for display and the software objects may interact with the touchscreen signals to detect characteristics about contact area 201 for adjusting the size/position of the displayed input option 105. In some embodiments, device 100 may detect biometric measurements of contact area 201 (e.g., size/shape). For example, contact area 201 may include an approximate width times an approximate height. In some embodiments, the width and height may be measured in pixels (the size of the pixels may depend on the screen resolution of touchscreen 103). Other measurements of contact area 201 are also contemplated. In some embodiments, device 100 may measure only one dimension (e.g., the width or height of contact area 201) to use in the graphical user interface configuration determination. In some embodiments, the biometric measurements may also indicate to device 100 which fingers the user is using for input. For example, device 100 may store characteristic shapes for thumb inputs, forefinger inputs, etc., and may compare these characteristic shapes to the shapes of contact areas 201 detected to determine if the detected contact areas 201 have similar shapes as the stored characteristic shapes. Other finger determination algorithms are also contemplated.

At 1105, device 100 may average a history of at least two past-detected contact areas 201. For example, device 100 may average the past n touches to determine average characteristics for contact area 201 (e.g., n may be 10, 20, 50, 100, etc). N may be a system default value and/or may be user provided. Device 100 may be made more sensitive by decreasing the value of n (such that the average characteristics react more rapidly over time). In some embodiments, device 100 may change the graphical user interface configuration only after a minimum of n touches have occurred since touchscreen device 100 was activated (or, for example, after a minimum of n touches of recent activity occurring after a delay of greater than t seconds, where t may be a default or user provided value (such as 30 seconds)). Characteristics may include an area calculation of the contact area 201, the width, height, and/or radius of the contact area 201, a characteristic shape of the contact area (e.g., approximately matches a thumbprint, forefinger print, stylus, etc).

By using averaging, device 100 may adapt to different users. For example, if a different user starts using touchscreen device 100, device 100 may adapt the graphical user interface configuration for the different user after the different user has touched device 100 at least n times. Device 100 may then adapt back to the original user's graphical user interface configuration after the original user touches touchscreen 103 at least n subsequent times. Device 100 may also adapt to different input characteristics from the same user. For example, if the same user begins to have a larger contact area 201 (e.g., because the user is pressing down with greater force or is using different fingers), device 100 may adapt the graphical user interface configuration accordingly.

At 1107, device 100 may determine a second graphical user interface configuration based at least partially on detected contact area 201. In some embodiments, the second graphical user interface configuration may be determined based on the average contact area. In some embodiments, device 100 may determine an input option size that will encompass detected contact area 201 (or average detected contact area). For example, device 100 may make the area/size of the input option (herein the "input option area") =factor*contact area or input option area=factor*average contact area. The factor may be, for example, 1.2. Other factors are also contemplated (e.g., 1.5, 2, 3, etc.). In some embodiments, the factor may be a default value and/or may be set by the user. In some embodiments, the factor and/or other characteristics about the graphical user interface configuration may be used for other applications. For example, the factor and/or input option spacings may be determined while the user is playing a game, but the same factor and/or input option spacings may be used during a word processing application. In some embodiments, the factor may be adjusted between applications.

The input option area may be used to determine the configuration of various input options. For example, the height and width for the corresponding area may be determined, for example, according to an equation such as 1.2 w*w=input option area where w is the width and 1.2 w is the height. Other equations are also contemplated (e.g., 5 w*w=input option area). In some embodiments, a factor may be determined and applied directly to only one dimension of input option 105. For example, a factor may be determined based on contact area 105 and applied to the width of input option 105 (and, therefore, in some embodiments, the height may not be adjusted (and vice versa)). Other shapes are also contemplated. For example, pi*r*r=input option area where r is the radius of a circular input option (e.g., input option 105q).

In some embodiments, the new graphical user interface configuration may include a repositioned input option 105. For example, device 100 may use the biometric measurements to determine which fingers are being used. If device 100 detects the user is using their thumbs for input, device 100 may propose/implement a graphical user interface configuration that is easier for thumb inputs (e.g., with larger input options 105 and/or with more input options 105 toward an edge of touchscreen 103 and fewer toward the center). Device 100 may also move input options 105 for other reasons. For example, if a user has mistakenly pressed one input option 105 when another specific input option 105 was intended, device 100 may move the intended input option 105 to the position the user is anticipating input option 105 to occupy. For example, if a user presses the down arrow key when the left arrow key was intended (as determined by analyzing how the user corrects his mistake), device 100 may switch the left arrow key and the down arrow key. In some embodiments, device 100 may propose new graphical user interface 107 with the moved input option 105 and/or point out new graphical user interface 107 to the user.

Other considerations may also affect the graphical user interface configuration determination. In some embodiments, device 100 may be able to detect the number of corrections and/or where the corrections were applied and may use this information in determining the graphical user interface configuration. For example, if the user is continuously correctly pressing the space bar (e.g., input option 105c), the new graphical user interface configuration may not increase the size of the space bar (even though, for example, the size of the other input options 105 may be increased).

Speed of input may be another consideration for determining the new graphical user interface configuration. In some embodiments, if the user input is being received slowly (e.g., less than a threshold of x inputs/minute, where x is, for example, 70 inputs/minute), device 100 may increase the size and/or spacing of input options 105 on graphical user interface 107. Other thresholds are also contemplated (e.g., 30 inputs/minute, 120 inputs/minute, etc). The thresholds may be application sensitive. For example, a fast paced gaming application may have a higher threshold (e.g., 200 inputs/minute) and a contact entry application may have a lower threshold (e.g., 30 inputs/minute). In some embodiments, device 100 may adjust the input option size/spacing based on the detected speed. For example, a faster input speed may result in smaller input options 105 than a slower input speed. In some embodiments, input options 105 of graphical user interface 107 may be shrunk and/or additional input options 105 may be included if the input speed is above a threshold (e.g., y inputs/minute such as 120 inputs/minute). In some embodiments, device 100 may consider a number of mistakes detected prior to decreasing the input option size.

Figure 12:
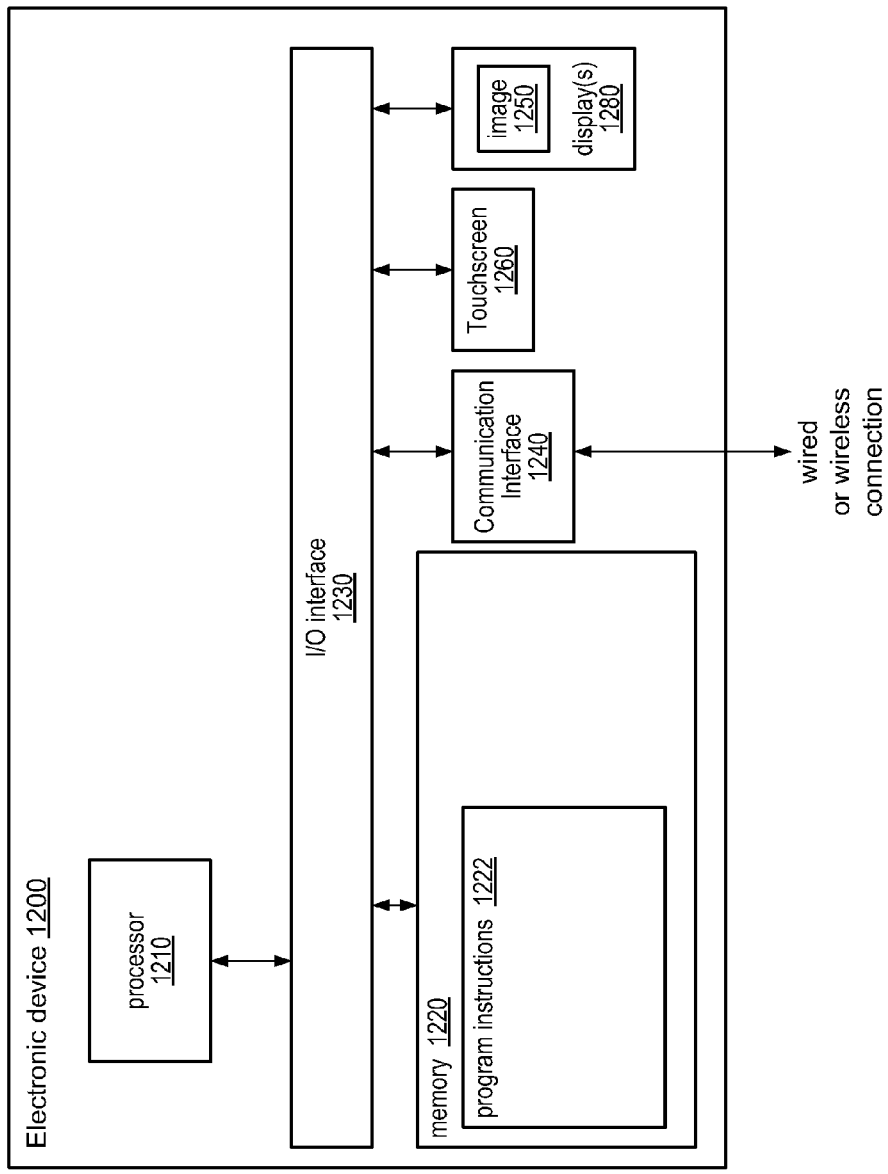
FIG. 12 illustrates an electronic device, according to an embodiment.

FIG. 12 is a block diagram illustrating constituent elements of an electronic device 1200 (e.g., a mobile phone, navigation system, etc.) that is configured to implement embodiments of the systems and methods described herein. The electronic device 1200 may include one or more processors 1210 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the electronic device 1200, such as various versions of Unix, Linux, Windows® from Microsoft Corporation, MacOS® from Apple Inc., or any other operating system that enables the operation of software on a hardware platform. The processor(s) 1210 may be coupled to one or more of the other illustrated components, such as a memory 1220, by at least one communications bus.

In one embodiment, a specialized graphics card or other graphics component may be coupled to the processor(s) 1210. The graphics component may include a graphics processing unit (GPU). Additionally, the electronic device 1200 may include one or more imaging devices. The one or more imaging devices may include various types of raster-based imaging devices such as an LCD display (liquid crystal display). In one embodiment, one or more display devices 1280 may be coupled to the processor 1210 and/or graphics component for display of data/images 1250.

In one embodiment, program instructions 1222 that may be executable by the processor(s) 1210 to implement aspects of the techniques described herein may be partly or fully resident within the memory 1220 at the electronic device 1200 at any point in time. The memory 1220 may be implemented using any appropriate medium such as any of various types of ROM or RAM (e.g., DRAM, SDRAM, RDRAM, SRAM, etc.), or combinations thereof. Any of a variety of storage devices may be used to store the program instructions 1222 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage may be coupled to the processor(s) 1210 through one or more storage or I/O interfaces. In some embodiments, the program instructions 1222 may be provided to the electronic device 1200 via any suitable computer-readable storage medium including the memory 1220 and storage devices described above.

The electronic device 1200 may also include one or more I/O interfaces, such as a touchscreen interface 1260 incorporated in the display 1280. In addition, the electronic device 1200 may include one or more communication interfaces 1240 providing access to a computer system and/or network. It should be noted that one or more components of the electronic device 1200 may be located remotely and accessed via the network. The program instructions may be implemented in various embodiments using any desired programming language, scripting language, or combination of programming languages and/or scripting languages, e.g., C, C++, C#, Java™, Perl, etc. The electronic device 1200 may also include numerous elements not shown in FIG. 12.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   displaying a graphical user interface with a first graphical user interface configuration;
   detecting a size of a contact area corresponding to a user input on a touchscreen to select at least one input option on the graphical user interface;
   determining a second graphical user interface configuration based at least partially on the size of the detected contact area of the user input and based on previous corrections made by the user to correct user input mistakes on the first graphical user interface configuration; and
   displaying the graphical user interface with the second graphical user interface configuration, the first and second graphical user interface configurations including the at least one input option that is different in at least one characteristic in each of the first and second graphical user interface configurations, and the at least one input option has the same function in each of the first and second graphical user interface configurations.

2. The computer-implemented method of claim 1, wherein the characteristic is size and wherein the at least one input option for the second graphical user interface configuration is a different size than the at least one input option of the first graphical user interface configuration.

3. The computer-implemented method of claim 1, wherein the characteristic is spacing and wherein the at least one input option for the second graphical user interface configuration includes a different spacing between the at least one input option and a neighboring at least one input option of the second graphical user interface configuration than a spacing between the at least one input option and the neighboring at least one input option of the first graphical user interface configuration.

4. The computer-implemented method of claim 1, wherein the first graphical user interface configuration comprises another at least one input option that is not included in the second graphical user interface configuration.

5. The computer-implemented method of claim 4, wherein the other at least one input option that is not included in the second graphical user interface configuration includes an input option determined to be used less than an input option that is included in both the first graphical user interface configuration and the second graphical user interface configuration.

6. The computer-implemented method of claim 1, wherein the second graphical user interface configuration includes only part of the first graphical user interface configuration and is accessible by selecting a menu option.

7. The computer-implemented method of claim 1, wherein at least one characteristic of the second graphical user interface configuration is determined while a user is using a first application, and wherein the at least one characteristic of the second graphical user interface configuration is applied to a graphical user interface configuration applied while a user is using a second application.

8. The computer-implemented method of claim 1, further comprising averaging a history of at least two past detected contact areas and wherein determining a second graphical user interface configuration based at least partially on the detected contact area comprises determining the second graphical user interface configuration based at least partially on an average of the at least two past detected contact areas.

9. An apparatus, comprising:
   a touchscreen configured to display a graphical user interface with a first graphical user interface configuration;
   at least one processor to execute program instructions that are configured to:
      detect a size of a contact area corresponding to a user input on the touchscreen to select at least one input option on the graphical user interface;
      determine a second graphical user interface configuration based at least partially on the size of the detected contact area of the user input and based on a stored history of input options selected by the user; and
      initiate a display of the graphical user interface with the second graphical user interface configuration on the touchscreen, the first and second graphical user interface configurations including the at least one input option that is different in at least one characteristic in each of the first and second graphical user interface configurations, and the at least one input option has the same function in each of the first and second graphical user interface configurations.

10. The apparatus of claim 9, wherein the characteristic is size and wherein the at least one input option for the second graphical user interface configuration is a different size than the at least one input option of the first graphical user interface configuration.

11. The apparatus of claim 9, wherein the characteristic is spacing and wherein the at least one input option for the second graphical user interface configuration includes a different spacing between the at least one input option and a neighboring at least one input option of the second graphical user interface configuration than a spacing between the at least one input option and the neighboring at least one input option of the first graphical user interface configuration.

12. The apparatus of claim 9, wherein the first graphical user interface configuration comprises another at least one input option that is not included in the second graphical user interface configuration.

13. The apparatus of claim 12, wherein the other at least one input option that is not included in the second graphical user interface configuration includes an input option determined to be used less than an input option that is included in both the first graphical user interface configuration and the second graphical user interface configuration.

14. The apparatus of claim 9, wherein the second graphical user interface configuration includes only part of the first graphical user interface configuration and is accessible by selecting a menu option.

15. The apparatus of claim 9, wherein at least one characteristic of the second graphical user interface configuration is determined while a user is using a first application, and wherein the at least one characteristic of the second graphical user interface configuration is applied to a graphical user interface configuration applied while a user is using a second application.

16. The apparatus of claim 9, wherein the program instructions are further executable to average a history of at least two past detected contact areas and wherein determining a second graphical user interface configuration based at least partially on the detected contact area comprises determining the second graphical user interface configuration based at least partially on an average of the at least two past detected contact areas.

17. A non-transitory computer-readable storage medium, storing program instructions, wherein the program instructions are computer-executable to:
  display a graphical user interface with a first graphical user interface configuration;
  detect a size of a contact area corresponding to a user input on a touchscreen to select at least one input option on the graphical user interface;
  determine a second graphical user interface configuration based at least partially on the size of the detected contact area of the user input; and
  display the graphical user interface with the second graphical user interface configuration, the first and second graphical user interface configurations including the at least one input option that is different in at least one characteristic in each of the first and second graphical user interface configurations, and the at least one input option has the same function in each of the first and second graphical user interface configurations.

18. The computer-readable storage medium of claim 17, wherein the characteristic is size and wherein the at least one input option for the second graphical user interface configuration is a different size than the at least one input option of the first graphical user interface configuration.

19. The computer-readable storage medium of claim 17, wherein the characteristic is spacing and wherein the at least one input option for the second graphical user interface configuration includes a different spacing between the at least one input option and a neighboring at least one input option of the second graphical user interface configuration than a spacing between the at least one input option and the neighboring at least one input option of the first graphical user interface configuration.

20. The computer-readable storage medium of claim 17, wherein the first graphical user interface configuration comprises another at least one input option that is not included in the second graphical user interface configuration.

21. The computer-readable storage medium of claim 20, wherein the other at least one input option that is not included in the second graphical user interface configuration includes an input option determined to be used less than an input option that is included in both the first graphical user interface configuration and the second graphical user interface configuration.

22. The computer-readable storage medium of claim 17, wherein the second graphical user interface configuration includes only part of the first graphical user interface configuration and is accessible by selecting a menu option.

23. The computer-readable storage medium of claim 17, wherein at least one characteristic of the second graphical user interface configuration is determined while a user is using a first application, and wherein the at least one characteristic of the second graphical user interface configuration is applied to a graphical user interface configuration applied while a user is using a second application.

24. The computer-readable storage medium of claim 17, wherein the program instructions are further executable to average a history of at least two past detected contact areas and wherein determining a second graphical user interface configuration based at least partially on the detected contact area comprises determining the second graphical user interface configuration based at least partially on an average of the at least two past detected contact areas.

25. The computer-implemented method of claim 1, wherein said determining the second graphical user interface configuration is also based on a stored history of input options selected by the user.

26. The apparatus of claim 9, wherein the program instructions are configured to determine the second graphical user interface configuration also based on previous corrections made by the user to correct user input mistakes on the first graphical user interface configuration.

27. The computer-readable storage medium of claim 17, wherein to determine the second graphical user interface configuration is also based on previous corrections made by the user to correct user input mistakes on the first graphical user interface configuration.

* * * * *